US006455119B2

(12) United States Patent
Carides et al.

(10) Patent No.: US 6,455,119 B2
(45) Date of Patent: Sep. 24, 2002

(54) LABEL STRUCTURE

(75) Inventors: James J. Carides, Lawrenceville; James T. Pittman, Lula; Benny R. Rich; George W. Hall, IV, both of Gainesville; Terry D. Futral, Newnan, all of GA (US)

(73) Assignee: Dittler Brothers Incorporated, Atlanta, GA (US)

( * ) Notice: Subject to any disclaimer, the term of this patent is extended or adjusted under 35 U.S.C. 154(b) by 0 days.

(21) Appl. No.: 09/191,000

(22) Filed: Nov. 12, 1998

(51) Int. Cl.[7] .......................... B32B 33/00; B32B 9/00; B42D 15/00

(52) U.S. Cl. .................... 428/42.2; 428/40.1; 428/41.7; 428/41.8; 283/103; 283/105

(58) Field of Search ......................... 428/42.2, 43, 916, 428/40.1, 41.7, 41.8, 42.3; 283/103, 105

(56) References Cited

U.S. PATENT DOCUMENTS 4,440,884 A * 4/1984 Jannusch ..................... 524/26
4,479,838 A 10/1984 Dunsim et al. ............. 156/347
4,510,019 A * 4/1985 Bartelloni .................... 162/141
4,846,504 A 7/1989 MacGregor et al. ........ 283/102
5,547,227 A * 8/1996 Laurash et al. ............... 283/81
5,569,512 A 10/1996 Brawner et al. .............. 428/29
5,601,887 A 2/1997 Rich et al. ..................... 428/29
5,944,355 A * 8/1999 Rich et al. ..................... 283/81

* cited by examiner

*Primary Examiner*—Harold Pyon
*Assistant Examiner*—Michael C. Miggins
(74) *Attorney, Agent, or Firm*—Geoff L. Sutcliffe, Esq.; Dean W. Russell, Esq.; Kilpatrick Stockton LLP

(57) ABSTRACT

A multi-ply label structure is especially, although not necessarily, adapted for affixation to a vessel. The multi-ply label is intended to protect a game piece, coupon, or other material from moisture and other detrimental external environments before affixation to the vessel. As a result, the bottle can be immersed in water for an extended period without destroying the integrity of the label structure.

13 Claims, 4 Drawing Sheets

LABEL STRUCTURE

FIELD OF THE INVENTION

This invention relates to labels and structural features thereof and more particularly to labels having game pieces, coupons, or promotional materials therein and which retain their integrity notwithstanding immersion in liquid nor exposure to detrimental external environments for extended periods.

BACKGROUND OF THE INVENTION

U.S. Pat. No. 4,846,504 to MacGregor, et al., incorporated herein in its entirety by this reference, discloses various "secure on-pack promotional coupons." Such coupons include concealed promotional materials and may be secured to packaging of consumer products. In one embodiment of the assemblies described in the MacGregor, et al. patent, the coupons consist of a set or series of labels, each label formed of a base portion, an intermediate (promotional) portion, and an outer portion.

Repeatedly emphasized in the MacGregor, et al. patent is the requirement that the promotional coupon be > secured to a product by water soluble adhesive, so that the purchaser of the product must run water over the label or coupon in order to expose the coupon . . . and remove it from the product.

See MacGregor, col. 1, lines 56–60; see also id., col. 2, lines 20–23; col. 4, line 67 through col. 5, line 6. According to the MacGregor, et al. patent, this requirement purportedly deters "persons from removing or tampering with the labels prior to purchasing the products." See id., col. 1, lines 63–65. It is, moreover, based on the assumption that water (or other liquid) is of only "limited availability . . . in stores." See id., line 61.

While not necessarily erroneous, the assumption made in the MacGregor, et al. patent is inconsistent with certain present-day practices. For example, grocery and convenience stores (among others) now often include freestanding displays in which plastic beverage bottles are wholly or partially immersed in ice water. Conventional coolers and other containers similarly surround bottles with ice water in many cases. In each of these instances, promotional coupons of the type disclosed in the MacGregor, et al. patent may lose their integrity through immersion in or contact with water. As the water contacts the promotional coupons, the effectiveness of the water-soluble adhesive is diminished, resulting in premature separation of the outer portion from the remainder of the assembly and undesired exposure of the intermediate (promotional) portion.

Moreover, some types of plastic and other bottles are cleansed with hot water after all labeling is affixed. This cleansing is also likely to disturb the water-soluble adhesive used in the promotional coupons of the MacGregor, et al. patent and precipitate loss of integrity of the overall label assembly. Again, the result is premature separation of the outer portion and exposure of the promotional material.

Among initial attempts to solve this problem associated with water baths was utilizing a film to attach a paper game piece to a bottle. The larger film, to which adhesive was applied to the perimeter of its underside, effectively sandwiched the game piece against the outer surface of the bottle. Any defect in applying the film to the bottle permitted water to seep beneath the film into contact with the paper game piece, however, diminishing its viability as a solution to the problem.

SUMMARY OF THE INVENTION

By contrast, the present invention avoids problems associated with, among other things, these water baths by providing a multi-ply label structure in which a game piece is sealed from the ambient environment before affixation to a bottle. Because developed for purposes different than the promotional coupons of the MacGregor, et al. patent, moreover, the label structures of the present invention do not utilize water-soluble adhesive to attach components to a bottle. Instead, the innovative labels described herein are designed especially to retain their integrity notwithstanding immersion in either hot or cold water (or other liquid) for extended periods.

A label according to one embodiment of the invention includes three plies. In this embodiment, a base ply is a filmic material, such as polypropylene, or other substrate whose underside is adherable to, among other things, a plastic bottle. Positioned atop the base ply, and typically (although not necessarily) of lesser length and width, is a middle ply or layer formed of, for instance, a paper or filmic material. The middle ply or layer is not limited to a single ply or material but, alternatively, may be a game piece or premium construction that includes, but is not limited to, labels, scratch off coatings, reactive coatings, redeemable materials, currency and the like. The underside of the middle ply may in some cases be temporarily adhered to the upper surface of the base ply, thereby forming a laminated structure.

Adhered to the base ply along the perimeter of its upper surface is a second ply, which is a polypropylene or other filmic material. This second ply constitutes the top of the multi-ply structure, and together with the base ply forms a pouch in whose central area the middle ply, which may be a game piece, coupon, or other material resides. The base and second plies and an adhesive attaching them are selected so as to be water-impervious, thereby sealing the game piece from any water that might contact the label. Thus, neither immersion in water of a bottle containing such a label nor defective affixation of the label to the bottle is likely to destroy the integrity of the multi-ply assembly or the contents of the game piece contained therein.

As noted above, if desired, the underside of the middle ply may contain an adhesive to prevent the game piece from changing position within the pouch. The multi-ply assembly additionally may be manufactured on a backing tape or web for easy storage and transport in rolls. Such web, as is conventional, would have an upper surface coated with a release layer to facilitate removal of the assembly for affixing to a bottle or other suitable substrate. Because the game piece is protected from moisture while within the assembly, furthermore, it may include inks, scratch-off coverings, holograms, labels, premiums, involvement devices, currency and other features that it otherwise could not successfully have.

Certain other embodiments of the invention utilize solely water-impervious or -insoluble materials to form multi-ply label structures. Containing two or more plies, such labels may include a base ply whose underside is adapted to be adhered to a substrate. Like base plies of embodiments of the invention discussed earlier, these base plies may be formed of filmic materials other than paper, including plastics such as (but not necessarily limited to) polypropylene, polystyrene, polyethylene, and polyester.

Positioned over each base ply is an upper, non-paper ply similarly typically, although not necessarily, formed of polypropylene or other material. In certain embodiments of the invention, no plies other than the base ply and upper ply are incorporated into the water-impervious label although additional upper plies may be desirable. The base ply and upper ply, therefore, contain all of the promotional or game-playing indicia present on the label.

To accomplish this result, the indicia, and any scratch-off coverings, are printed directly onto either or both of the base ply and upper ply. The upper surface of the base ply is especially suited for receiving this printed indicia, as either a removable covering printed onto the upper surface of the base ply over the indicia, or an opaque covering printed on either surface of the upper ply, may obscure the printed indicia from view. Alternatively, the indicia (and perhaps a scratch-off covering) may be placed on the underside of the upper ply, with the top surface of the upper ply containing an opaque, water-insoluble ink designed to prevent premature viewing of the contents of the underside of the ply. In similar embodiments containing three or more plies, water-insoluble inks are not necessary for use on the top surface of the upper ply if other plies protect the inks from the likely ambient environment. Yet another alternative is to print the indicia onto an opaque "lilly pad" of ink printed directly onto the underside of the upper ply. Alternatively, gaming or other premium indicia may be printed or imaged similarly as previously mentioned while absent of specific opacifying materials. Such indicia or coatings would require only resistance properties to survive immersion or moisture exposure.

These two-ply versions of the present invention usually are designed so that only peripheral portions of the base ply and upper ply are adhered to each other. If perforations on the upper ply delineate the peripheral boundaries of the ply adhered to the base ply, the central portion of the upper ply may be made to be removable simply by tearing it along the perforations. Doing so exposes both the underside of the upper ply and the upper surface of the base ply as well as any indicia or scratch-off coverings printed thereon.

It is therefore an object of the present invention to provide a label structure that includes a game piece, coupon, or other promotional material.

It is another object of the present invention to provide a label structure which retains its integrity notwithstanding immersion in liquid or other exposure to moisture for extended periods.

It is an additional object of the present invention to provide a label structure in which the game piece forming part of the assembly is sealed from the ambient environment before being affixed to, e.g., a bottle or other packaging vessel.

It is a further object of the present invention to provide a label structure avoiding use of a water-soluble adhesive to attach any portion of the structure to a bottle or other surface.

It is also an object of the present invention to provide a three-ply label including a layer of film and a base layer positioned intermediate the film layer and a substrate such as a bottle.

It is yet another object of the present invention to provide a label utilizing solely water-impervious or insoluble materials.

It is still a further object of the present invention to provide a label that utilizes adhesive that are recyclable or repulpable.

other objects, features, and advantages of the present invention will become apparent with reference to the remainder of the text and the drawings of this application.

DETAILED DESCRIPTION

Figure 1:
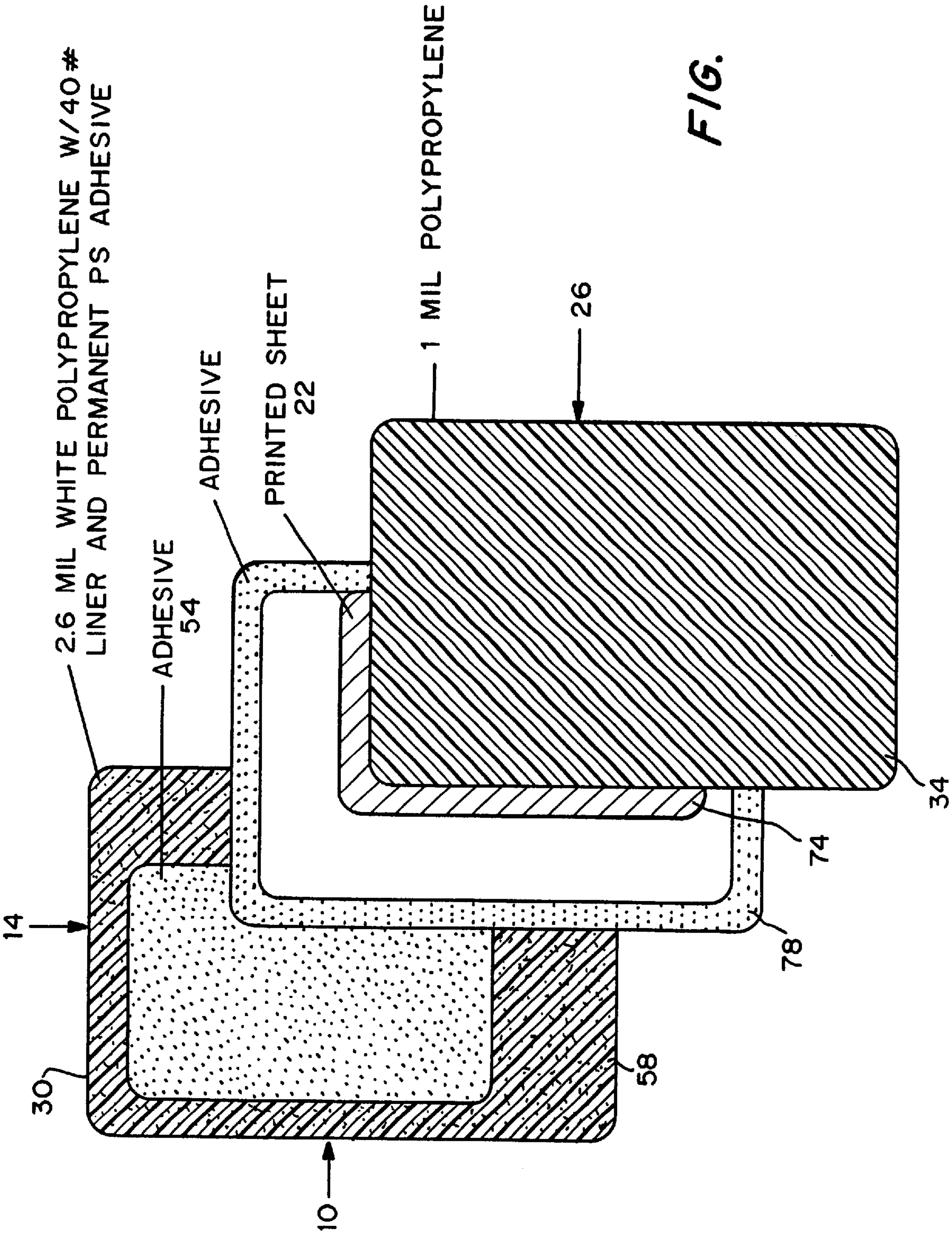
FIG. 1 is an exploded perspective view of a label structure according to a first embodiment of the present invention.
Figure 2:
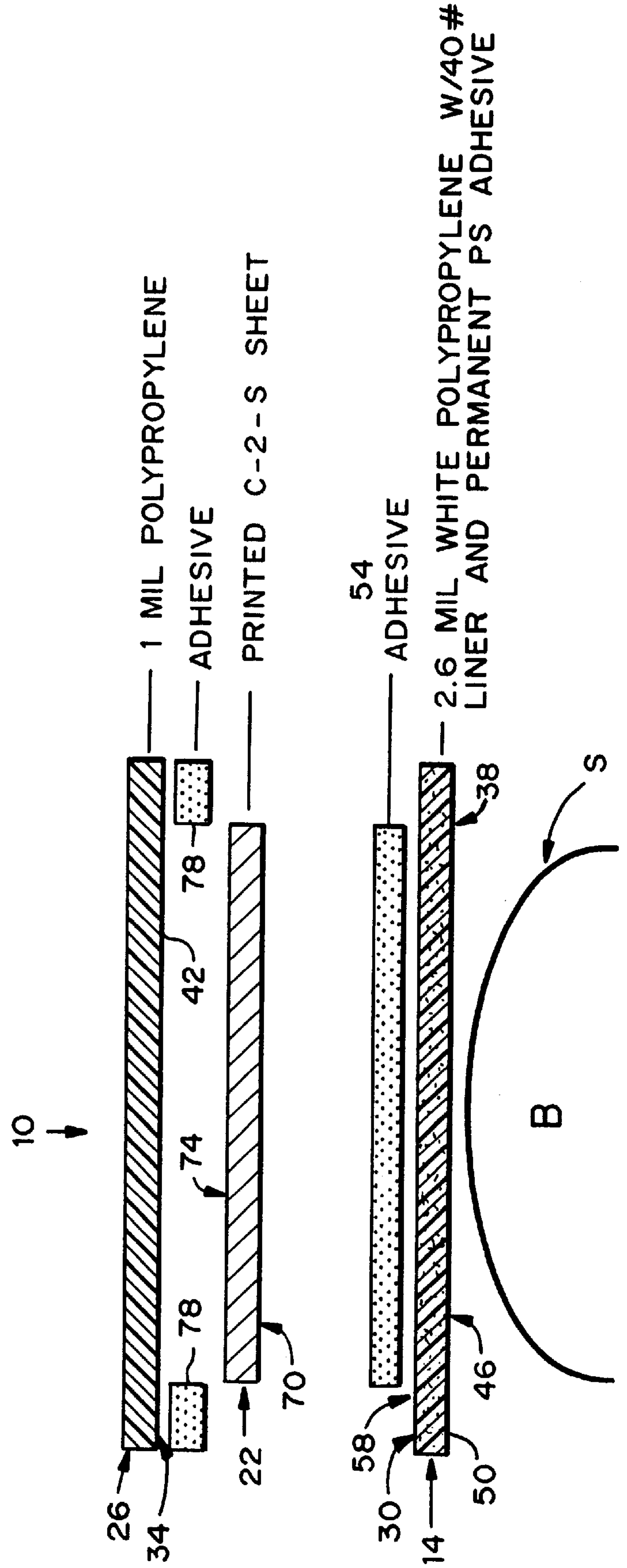
FIG. 2 is an exploded-cross-sectional view of the label structure of FIG. 1 before attachment to a bottle.

Illustrated in FIGS. 1–2 is an exemplary label 10 according to a first embodiment of the present invention. The label 10 shown in FIGS. 1–2 includes three plies: a base 14 ply, a middle ply or game portion 22, and a second ply 26. In use, these plies are effectively laminated to form the single assembly 10 which may be attached to a substrate, such as bottle B.

Each of base ply 14 and second ply 26 may have the same length and width if necessary or desired. Equating dimensions of these components may enhance the aesthetic appeal of the label 10 in some cases and may promote protection of game portion 22 from the ambient environment. Base ply 14 and second ply 26 need not be dimensioned identically, however, nor need they be substantially rectangular as shown in FIGS. 1–2. Instead, those skilled in the art will recognize that these components may have different dimensions and shapes than those expressly illustrated herein.

Generally, however, the length and width of game portion 22 will be less than those of base ply 14 and second ply 26. These relative dimensions permit the base ply 14 and the second ply 26 to encase game portion 22 when their respective peripheries 30 and 34 are adhered. As so encased, game portion 22 is sealed in a pouch or protective enclosure formed between central areas 38 and 42 of base ply 14 and second ply 26, respectively.

Certain embodiments of label 10 are designed to include clear polypropylene film (which may be one mil thick) as the second ply 26. Because such film is impervious to water, sealing game portion 22 underneath second ply 26 helps prevent any substantial seepage of moisture into the pouch containing game portion 22. Thus, game portion 22 is not typically subjected to the detrimental effects of moisture even should it be bathed or immersed in water for an extended period of time. This avoidance permits game portion 22 to have numerous features (such as inks, scratch-off materials, etc.) to enhance its promotional or entertainment abilities that otherwise could not be present if subject to contact with moisture.

Base ply 14 may, if desired, be a layer of greater thickness than second ply 26. In addition to helping seal game portion 22 from moisture, base ply 14 functions to attach the remainder of label 10 to the bottle B or another substrate. It thus must be sufficiently thin and flexible to accommodate and conform to a contoured surface S of bottle B yet sufficiently strong to maintain its structural integrity when subjected to automatic affixation techniques, temperature extremes, and moisture. A presently-preferred material for the base ply 14 is a 2.6 mil thick white polypropylene film with a #43 liner, which also has sufficient opacity to prevent someone from visually discerning the contents of game portion 22 by peering through whatever liquid is contained within bottle B. The base ply 14 is not limited to this material but may be formed of other filmic materials that are water-impervious, such as polyethylene, polystyrene, or polyester.

Because a consumer need not remove base ply 14 from the bottle B to access game portion 22, base ply 14 may be attached to the bottle B using a substantially permanent pressure-sensitive or other adhesive 46 placed on its underside 50.

The adhesive 46 used to-secure the base ply to the substrate is preferably also recyclable. Some commonly used adhesives to secure labels to a substrate are incompatible with recycling processes. In the recycling of PET bottles and other goods, the PET is reclaimed by placing the goods in a caustic bath, such as a 1% sodium hydroxide bath. Some of the commonly used adhesives, however, are not removed after being immersed in the sodium hydroxide bath and are therefore not recyclable. Further, some of these adhesives are not repulpable since the presence of these adhesives contaminate the PET recycling stream.

In the label 10 according to a preferred embodiment of the invention, the adhesive 46 is one that resists water permeation but which is resoluble upon exposure to a caustic bath. As a result, the adhesive 46 complies with recyclability parameters such that its residual effects be cleanly removed following a mild caustic bath exposure. Examples of suitable adhesives 46 include, but are not limited to, EOA 109 from Fasson Roll North America (FRNA), a division of Avery Dennison of Pasadena, Calif. and #758 from Green Bay Packaging of Green Bay, Wis.

By contrast, game portion 22 is typically removed from base ply 14 by shearing a suitable adhesive 54, including one cured using ultraviolet radiation (a "UV adhesive"), a laminating adhesive, or a pressure sensitive adhesive. The adhesive 54 may be applied either to upper surface 58 of base ply 14 or underside 70 of the game portion 22, or both, to adhere the two together.

Placed atop adhesive 54 and upper surface 58 in central area 38 is the game piece 22. If completely or substantially opaque, game portion 22 may include text, symbols, or other information on its underside 70 that is obscured from view on the one hand by its upper surface 74 and on the other by the base ply 14. Similarly, because game portion 22 obscures central area 38 of upper surface 58 from view, hidden textual or other information may be printed or otherwise included thereon as well. As noted above, scratch-off or other material, including any or all of the elements of the cards disclosed in U.S. Pat. Nos. 5,569,512 to Brawner, et al. and 5,601,887 to Rich, et al. (incorporated herein in their entireties by this reference), may be included on either or both of underside 70 or upper surface 74 of game portion 22 as well as upper surface 58 of base ply 14 or conversely the underside of the second layer 26.

To encase game portion 22, an adhesive 78 is applied to either or both of peripheries 30 and 34 to bond them together. Doing so effectively forms a pouch or protective enclosure between central areas 38 and 42 in which game portion 22 resides. If necessary or appropriate to prevent game portion 22 from moving within the pouch, the adhesive 54 may be used to attach underside 70 of the game portion 22 or to the upper surface 58 of the base ply 14. Adhesives 78 and 54 may, in the vernacular of the MacGregor, et al. patent, be "removable" or otherwise temporary bonding agents, as they usually should not prevent a consumer from removing game portion 22 from the remainder of the label 10. It may be further desirable that adhesives 78 and 54 be permanent in nature thus requiring physical invasive methods such as cutting of the pouch to remove game portion 22.

To access game portion 22, in most cases the consumer need merely peel second ply 26 away from the remainder of the label 10. Facilitating such removal may be information printed on the upper surface 58 of the base ply 14 such as the phrase "pull here" and an arrow pointing to a corner of the label 10. Removing the second ply 26 exposes the upper surface 74 of game portion 22. If (temporary) adhesive 54 is present, a consumer may merely peel composite game portion 22 away from the upper surface 58 of the base ply 14 to expose underside 70 and remove the game portion 22 from the remainder of label 10. Alternatively, the game portion 22 may possess a perforation along a select region delineating a tab enabling adhesive 54 to selectively: bond the tab to the upper surface 58 of the base ply 14 while permitting a residue free portion of the game portion 22 to be cleanly removed.

Those skilled in the art will recognize that game portion 22 is not limited to two-sided structures, but may instead contain folds, cut-outs, or pop-ups, for example, or otherwise be more complex than a simple two-sided material. Further, as discussed above, the game portion 22 is not limited to a single ply structure but may encompass a scratch off coating, a hologram, and other additional layers or coatings. Additionally, in some cases, game portion 22 may be of foreign origin such as a stamp, tattoo, currency or other premium or incentive.

Figure 3:
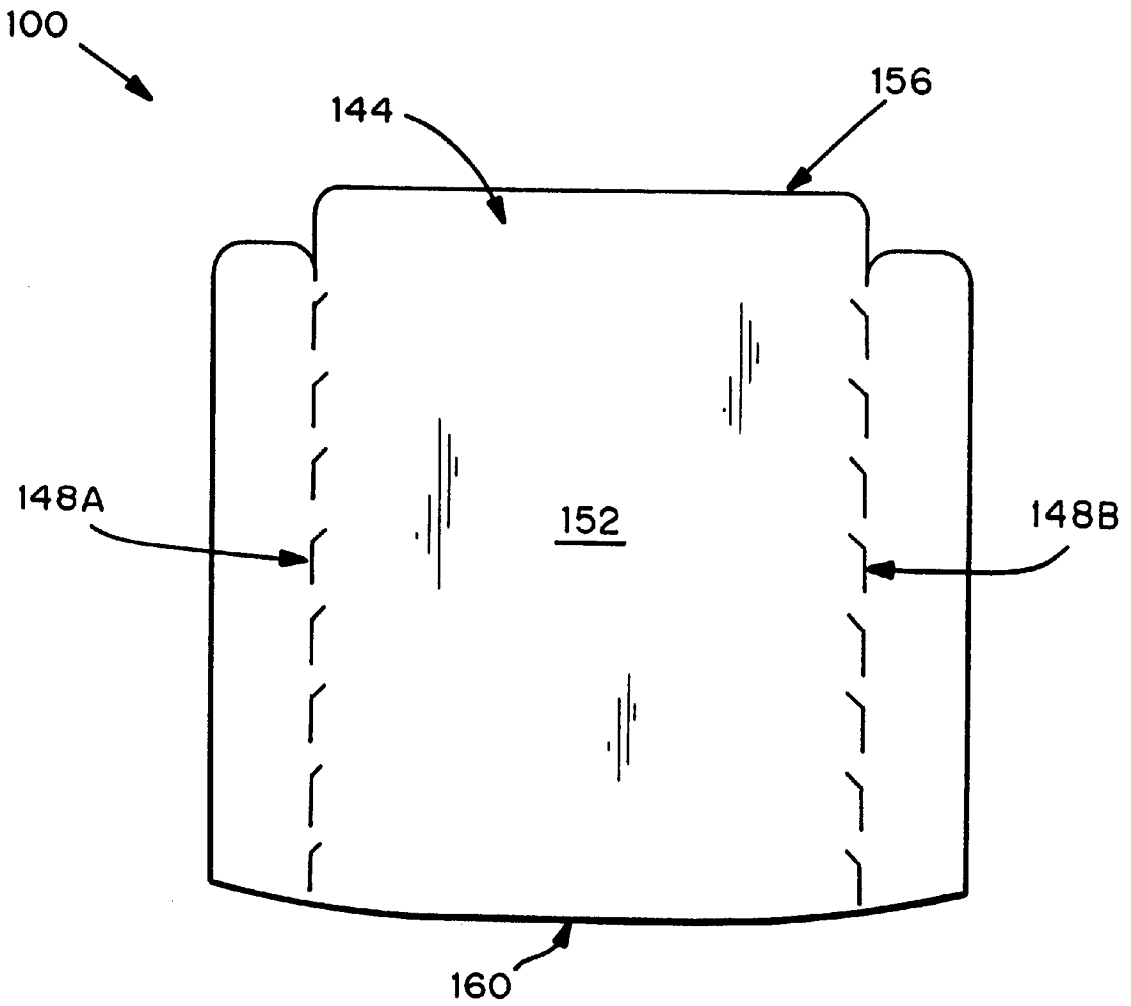
FIG. 3 is a plan view of a label structure according to a second embodiment of the present invention.
Figure 4:
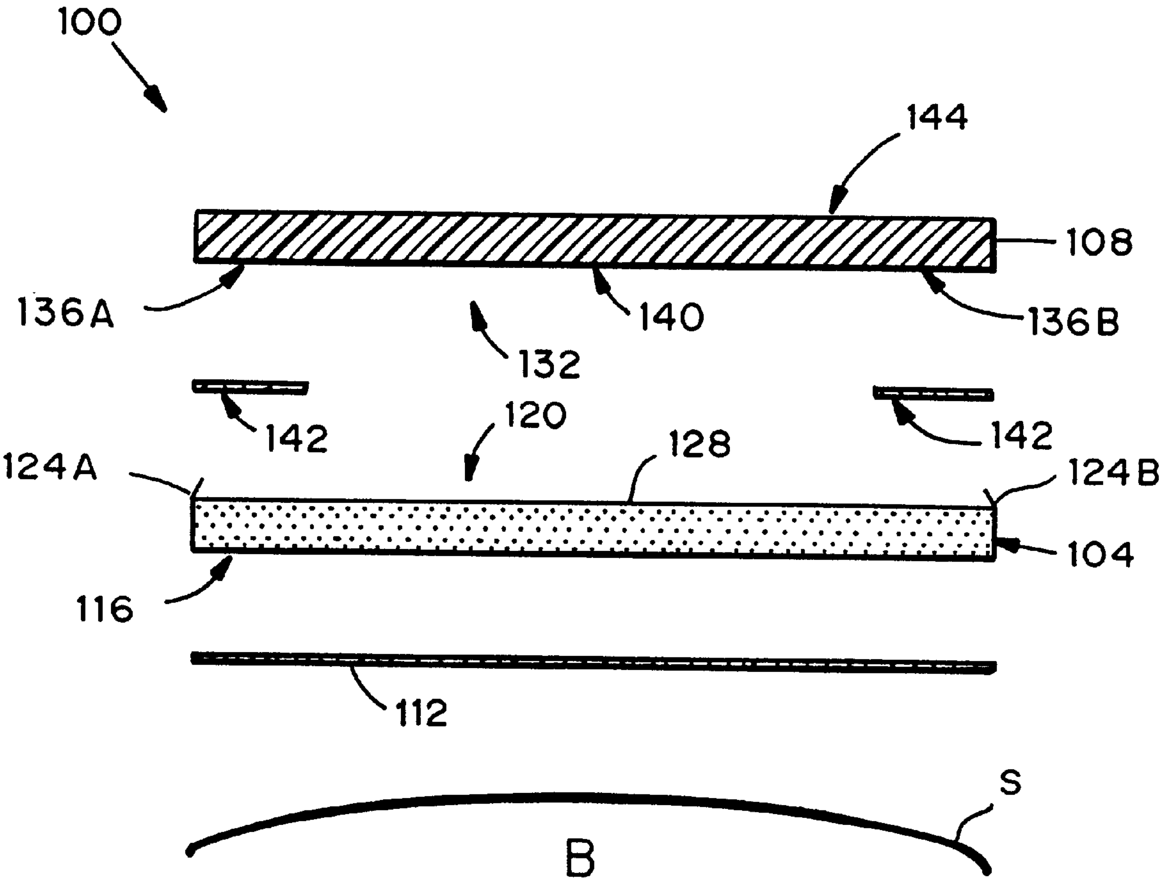
FIG. 4 is an exploded cross-sectional view of the label structure of FIG. 3 before attachment to a bottle.

FIGS. 3–4 detail an alternative label 100 of the present invention. As shown in these figures, the label 100 includes base ply 104 and upper ply 108. Both base ply 104 and upper ply 108 are made of water-impervious materials such as, for example, polypropylene. In some versions of assembly 100, base ply 104 may be similar or identical to base ply 14 of FIGS. 1–2. Also, the upper ply 108 may be similar or identical to the second ply 26.

In use, the label 100 is intended to be attached to a bottle B or other substrate. Adhesive 112 (which may be pressure sensitive if appropriate) thus may be placed on an underside 116 of the base ply 104, with such adhesive 112 connecting the label 100 to a surface S of a bottle B. Since in most (if not all) instances consumers need not remove base ply 104 from the bottle B, the adhesive 112 may be water-insoluble or otherwise substantially permanent. Because the bottle B may need to be recyclable, the adhesive 112 is preferably a recyclable adhesive that degrades upon exposure to a mild caustic bath. Suitable adhesives includes those mentioned-above with reference to adhesive 46.

Upper surface 120 of base ply 104 defines peripheral portions or edges 124A and 124B, intermediate which is central portion 128. Lower surface 132 of upper ply 108 likewise defines edges 136A and 136B and a central portion 140. By applying a water-insoluble adhesive 142 to either edges 124A or 136A (or both) and edges 124B and 136B (or both) and affixing edge 124A to edge 136A and edge 124B to edge 136B, a single label assembly 100 may be formed. Such affixation usually occurs prior to the label 100 being connected to the bottle B or a similar substrate, although it need not if necessary to do otherwise. In addition to being insoluble in water, the adhesive 142 may also be substantially permanent if desired.

Also illustrated in FIGS. 3–4 is top surface 144 of the upper ply 108. Sets of perforations 148A and 148B extend from top surface. 144 through to lower surface 132 of upper ply 108, with perforation set 148A differentiating edge 136A from central portion 140 and perforation set 148B differentiating edge 136B from the central portion 140. The central portion 140 of the upper ply 108 has an upper surface 152. To remove the central portion 140 of the upper ply 108 from the remainder of the label 100, a consumer need merely grasp a top section 156 of the upper ply 108 and pull it toward a bottom section 160 of the upper ply 108 to rupture the perforations of sets 148A and 148B.

Because the materials incorporated in the label 100 are impervious to water, they are unlikely to be damaged or altered due to exposure from the ambient environment when assembly 100 is intact. Either or both of such central portions 128 and 140 may thus contain promotional or game-playing indicia unlikely to be damaged even should bottle B be placed for an extended period in an ice-water bath. Either or both of central portions 128 and 140 additionally may include a scratch-off or other removable coating if desired to obscure the indicia from view temporarily. If game indicia is printed directly onto central portion 140 (without, for example, an underlying "lilly pad" of ink) and upper ply 108 is transparent, opaque, water-insoluble ink may need to be applied to top surface 152 of the central portion 140 to prevent viewing of the indicia (through the transparent ply 108) before the central portion 140 is removed from the remainder of the label 100.

The foregoing is provided for purposes of illustrating, explaining, and describing embodiments of the present invention. Further modifications and adaptation to these embodiments will be apparent to those skilled in the art and may be made without departing from the scope of spirit of the invention.

We claim:

1. A label for attachment to a substrate and for providing a protective enclosure for a promotional element, comprising:

a. a water-impervious base ply having:
   i. an upper surface;
   ii. a lower surface;
   iii. a peripheral portion; and
   iv. a central portion;

b. a water-impervious upper ply having:
   i. a top surface;
   ii. a bottom surface;
   iii.a peripheral portion; and
   iv. a central portion;

c. a first water-insoluble adhesive applied to the lower surface of the base ply for attaching the base ply to the substrate, the first water-insoluble adhesive being soluble in a caustic bath;

d. a second water-insoluble adhesive applied to the peripheral portion of at least one of the base ply and upper ply so as to attach the base ply and upper ply; and e. the promotional clement for being placed in the protective enclosure wherein the protective enclosure for receiving the promotional element is defined between the central portion of the upper ply and the central portion of the base ply;

wherein the water-impervious base ply, the water-impervious upper ply, and the water-insoluble adhesive prevent migration of moisture to the promotional element, whereby the integrity of the promotional element can be maintained when the substrate and the label with the promotional element are immersed in water;

the label further comprising the element and wherein the element is a middle ply.

2. The label according to claim 1, wherein the middle ply includes indicia printed on at least one of a top surface of the middle ply or a bottom surface of the middle ply.

3. The label according to claim 1, further comprising an adhesive for securing the middle ply to at least one of the base ply or upper ply.

4. The label according to claim 1, wherein the middle ply includes a set of perforations for defining first and second sections and wherein the first section is adhered to one of the base ply or the upper ply.

5. The label according to claim 4, wherein the adhesive is not applied to the second section.

6. The label according to claim 1, wherein the base ply and upper ply comprise films.

7. The label according to claim 1, wherein the base ply and upper ply are made of a synthetic material.

8. The label according to claim 1, wherein the base ply and upper ply are made of polypropylene.

9. The label according to claim 1, wherein the second adhesive is soluble in a caustic bath.

10. A label for attachment to a substrate and for use with a promotional piece, comprising:

a. a water-impervious base ply having:
   i. an upper surface;
   ii. a lower surface;
   iii. a peripheral portion; and
   iv. a central portion;

b. a water-impervious upper ply having:
   i. a top surface;
   ii. a bottom surface;
   iii. a peripheral portion; and
   iv. a central portion;

c. a first water-insoluble adhesive applied to the lower surface of the base ply for attaching the base ply to the substrate;

d. a second water-insoluble adhesive applied to the peripheral portion of at least one of the base ply and upper ply so as to attach the base ply and upper ply;

e. a middle ply positioned between the base ply and the upper ply and being sized to be contained within at least one of the central portion of the base ply or the central portion of the upper ply, the middle ply forming part of the promotional piece and having:
   i. a first section;
   ii. a second section; and
   iii. a set of perforations for defining a boundary between the first and second sections; and f. a third adhesive for securing the first section of the middle ply to at least one of the upper surface of the base ply or the bottom surface of the upper ply;

wherein the adhesive is not applied to the second section of the middle ply whereby the second section of the middle ply may be removed from the first section along the set of perforations; and wherein the water-impervious base ply, the water-impervious upper ply, the first and second water-insoluble adhesive prevent migration of moisture to the middle ply, whereby the integrity of the middle ply can be maintained when the substrate and label are immersed in water.

11. The label according to claim 10, wherein the base ply and upper ply comprise films.

12. The label according to claim 10, wherein the base ply and upper ply are made of a synthetic material.

13. The label according to claim 10, wherein the base ply and upper ply are made of polypropylene.

* * * * *